United States Patent
Kissner et al.

(10) Patent No.: US 12,045,878 B1
(45) Date of Patent: Jul. 23, 2024

(54) MANAGED ACCOUNT CONTINUUM SYSTEM AND METHOD

(71) Applicant: United Services Automobile Association (USAA), San Antonio, TX (US)

(72) Inventors: Jeffrey Kissner, San Antonio, TX (US); Macdonald Etugbo, Helotes, TX (US); Joren Mathijs Scharn, San Antonio, TX (US); Pablo Guadalupe Trevino, San Antonio, TX (US); John David Livingston, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/841,408

(22) Filed: Jun. 15, 2022

Related U.S. Application Data

(63) Continuation of application No. 16/680,189, filed on Nov. 11, 2019, now Pat. No. 11,379,914, which is a
(Continued)

(51) Int. Cl.
*G06Q 40/00* (2023.01)
*G06Q 40/03* (2023.01)
(Continued)

(52) U.S. Cl.
CPC ............ *G06Q 40/03* (2023.01); *G06Q 40/06* (2013.01); *G06Q 40/08* (2013.01); *G06F 3/0482* (2013.01)

(58) Field of Classification Search
CPC ........ G06Q 40/00; G06Q 40/03; G06Q 40/06; G06Q 40/08; G06F 3/0482
See application file for complete search history.

(56) References Cited

U.S. PATENT DOCUMENTS

| | | |
|---|---|---|
| 2002/0019791 A1 | 2/2002 | Goss et al. |
| 2002/0111890 A1 | 8/2002 | Sloan et al. |
| (Continued) | | |

OTHER PUBLICATIONS

Industrial internet of things: unleashing the potential of connected products and services I Agenda—White Paper, in Collaboration with Accenture, 2015—afyonluoglu.org (Year: 2015).*
(Continued)

*Primary Examiner* — Lalita M Hamilton
(74) *Attorney, Agent, or Firm* — Fletcher Yoder, PC

(57) ABSTRACT

A system includes a server operable to communicatively couple with a customer interface device (CID) such that state-of-life inputs from the CID are communicated to the server. The server includes a memory configured to store the state-of-life inputs and storing a program executable by a processor of the server. The server also includes a processor configured to execute the program such that the program determines a financial service product based on the state-of-life inputs and such that the server issues a communication to the CID including a recommendation of the financial service product. The processor is also configured to format one or more selections made by the customer from the recommendation on a single-rail managed account product continuum having two or more financial service products.

20 Claims, 5 Drawing Sheets

Related U.S. Application Data continuation of application No. 15/290,830, filed on Oct. 11, 2016, now Pat. No. 10,475,119.

(60) Provisional application No. 62/240,332, filed on Oct. 12, 2015.

(51) Int. Cl.
*G06Q 40/06* (2012.01)
*G06Q 40/08* (2012.01)
G06F 3/0482 (2013.01)

(56) References Cited

U.S. PATENT DOCUMENTS

| | | |
|---|---|---|
| 2010/0094774 A1 | 4/2010 | Jackowitz et al. |
| 2011/0040581 A1 | 2/2011 | Wirth |
| 2011/0178910 A1 | 7/2011 | Benefield et al. |
| 2014/0188758 A1 | 7/2014 | Harper et al. |
| 2015/0363862 A1 | 12/2015 | Ranft et al. |
| 2021/0166322 A1* | 6/2021 | Allen ................... G06Q 40/08 |

OTHER PUBLICATIONS

Schewe, Charles D. "Strategically positioning your way into the aging marketplace" Business Horizons 34.n3: p. 59 (8). Elsevier Advanced Technology Publications. (May 1991-Jun. 1991) (Year: 1991).

* cited by examiner

MANAGED ACCOUNT CONTINUUM SYSTEM AND METHOD

CROSS REFERENCE TO RELATED APPLICATION

This application is a continuation of U.S. patent application Ser. No. 16/680,189, entitled "Managed Account Continuum System and Method," filed Nov. 11, 2019, which is a continuation of U.S. patent application Ser. No. 15/290,830, now U.S. Pat. No. 10,475,119, entitled "Managed Account Continuum System and Method," filed Oct. 11, 2016, which claims the benefit of U.S. Provisional Application No. 62/240,332, entitled "Managed Account Product Continuum System and Method," filed Oct. 12, 2015, which are hereby incorporated by reference in their entireties for all purposes.

BACKGROUND

The present disclosure relates generally to systems and methods for offering a managed account, and more specifically, to a managed account product continuum for various financial service products.

Modern businesses offer an array of services (e.g., financial services) that are electronically accessible, such as via the Internet. For example, modern businesses may offer banking and savings services, investment services, insurance services, mortgage services, annuities products, and other services through the Internet. However, it is now recognized that there is a continued need for improving interfacing with, and management of, various products to facilitate ease of access and understanding for users.

BRIEF DESCRIPTION

A system in accordance with an embodiment of the present disclosure includes a server operable to communicatively couple with a customer interface device (CID) such that state-of-life inputs from the CID are communicated to the server. The server includes a memory configured to store the state-of-life inputs and to store a program executable by a processor of the server. The server also includes a processor, where the processor is configured to execute the program such that the program determines a financial service product based on the state-of-life inputs and such that the server communicates, to the CID, a recommendation of the financial service product. The processor is also configured to format selections made by the customer from the recommendation on a single-rail managed account product continuum having two or more financial service products.

A method of providing a single-rail managed account product continuum in accordance with an embodiment of the present disclosure includes receiving, from a customer interface device (CID), state-of-life inputs of the customer. The method also includes determining, based at least in part on the state-of-life inputs, a recommendation of one or more financial service products for the customer. The method also includes communicating, to the CID, the recommendation of the one or more financial service products for the customer. The method also includes receiving, from the CID, a selected financial service product selected by the customer from the recommendation of the one or more financial service products. The method also includes formatting, on a first graphical user interface (GUI) viewable on a display of the CID, the selected financial service product disposed on the single-rail managed account product continuum along with other of the customer's financial service products.

A method of generating a feature continuum of a financial service product in accordance with an embodiment of the present disclosure includes receiving, from a customer, state-of-life inputs. The method also includes generating, based at least in part on the state-of-life inputs, a recommendation of one or more selectable features corresponding with the financial service product. The method also includes displaying the recommendation in a first stream of a first graphical user interface (GUI). The method also includes receiving, from the customer, a selected feature from the one or more selectable features of the recommendation. The method also includes displaying the selected feature in a second stream of the first GUI. The method also includes displaying in the first stream, the second stream, or both an effect of the one or more selectable features, the selected feature, or both, respectively, on the financial service product.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
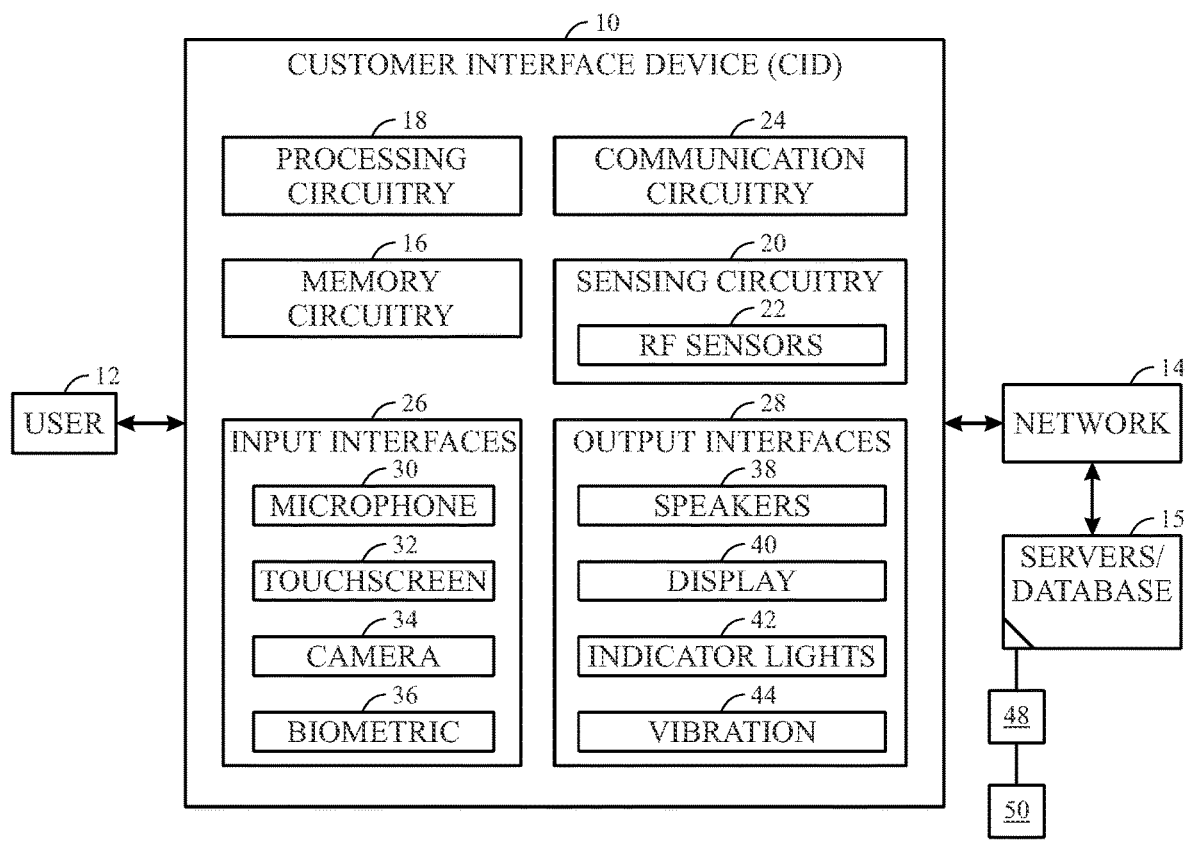
FIG. 1 is a schematic representation of an embodiment of a customer interface device (CID), in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for providing customers a single-rail managed account product continuum (e.g., accessible via the Internet), and more specifically, to providing customers a single-rail managed account product continuum for customer management of financial service products. For example, in accordance with the present disclosure, a financial services company may offer to a customer a single-rail managed account available and utilized over a long period of time (e.g., for a duration of the customer's life). The managed account may be an umbrella account that enables access to multiple sub-accounts or products, such as financial service products. During the course of the customer's life, certain products that comply with the customer's current lifestyle, life events, or time- or age-specific needs may be made available to the customer. In some embodiments, the products may be offered based on life events or other feedback communicated to the managed account. For example, if the customer weds, becomes a parent, has a significant medical emergency or need, reaches a certain age, or is affected by some other life event, pertinent products or features of products may be made available to the customer.

In one embodiment, features of a particular product (e.g., primary banking, basic medical insurance, auto insurance, mortgage services, annuities products, and trust services) included on the single-rail managed account product continuum may change in response to the customer's life events and/or to the customer's accumulated wealth or income. For example, types of advisement may change (e.g., strategically, aesthetically, functionally [from digital to personal, or personal to digital]) for a particular product as the customer's needs change and as the customer's wealth management becomes more or less complex. Changing features for a particular product on the single-rail managed account product continuum may be referred to as a "feature continuum" corresponding with the particular product, and the feature continuum (and corresponding customer options) may be accessible (e.g., displayable) on, or selectable from, a display of the single-rail managed account product continuum. It should be noted that each product included on the single-rail managed account product continuum may include a corresponding feature continuum, and that each feature continuum may be accessible (e.g., displayable) on, or selectable from, the display of the single-rail managed account product continuum.

By offering a wide range of products (e.g., financial service products, and/or insurance products) via the single-rail managed account product continuum, management and understanding of the products is simplified for the customer. Further, by tailoring the wide range of products (and features or customer management/decisions thereof) to the customer's specific life events, life goals, state-of-life, and/or financial demographics, effectiveness and relevance of the products is increased for the customer. Additionally, by offering the single-rail managed account product continuum, the financial services company may increase business interaction with the customer (e.g., by encouraging the customer to engage in a wide range of financial service products from the financial services company, as opposed to only a few).

The term "single-rail" is used to describe longevity, accessibility, and product range features of the managed account. For example, the term "single-rail" describes how the managed account may cover a wide range of products over a long period of time, where each of the products may be offered to, and accepted by, the user based on a personal experience of the user. In other words, certain products available for the single-rail managed account product continuum may be beneficial before, during, or after certain personal experiences (e.g., life events) of the user. Such products may be offered at specific times or time intervals relative to the personal experiences of the user to increase a likelihood that the user utilizes the product(s) and to increase a value of the product(s) for the user. The term "single-rail" also emphasizes the unified and time-based nature of the managed account product continuum, which simplifies access to users by providing easily accessible products and information that are relevant to the life phase of the user.

Further, the term "product continuum" may refer to an illustration or digital manager included in a graphical user interface ("GUI") (e.g., shown on a display of a customer interface device, or "CID"). The product continuum may include, for example, a list of products recommended to, and/or selected by, the customer in accordance with the present disclosure. Depending on the embodiment, the products on the single-rail product continuum may be ordered, for example, chronologically (e.g., with respect to a date of recommendation, a date of selection, or both). Further, recommended products and selected products may be displayed on separate GUIs, or on the same GUI (e.g., separated within the same GUI by first and second "streams"). In some embodiments, each individual product may include a "feature continuum" viewable in the same or a different GUI, where the feature continuum may include, for example, recommended and selected features (illustrated in first and second streams) associated with one particular product on the product continuum. Such aspects of the single-rail managed account product continuum will benefit product providers and users.

FIG. 1 is a schematic representation of an embodiment of a customer interface device (CID) 10 interfacing with a user 12 (e.g., customer) and an online service (servers/database 15) that offers, for example, financial services and products. In the illustrated embodiment, interfacing occurs via a network 14, such as an Internet system. The CID 10 illustrated in FIG. 1 is a computing device having memory circuitry 16 and processing circuitry 18 generally capable of storing and executing instructions to provide certain functionality described below.

In accordance with the present disclosure, the CID 10 may be a specialized computing device that stands alone or that cooperates with another device (e.g., a smart phone or home computer). In other embodiments, the CID 10 may be a general purpose computing device, such as a laptop computer, a personal computer, a tablet, a mobile device, or a smart phone that is programmed in a manner that makes it specialized. The CID 10 may be programmed to execute, via the processing circuitry 18, instructions (e.g., software modules, applications, apps) stored on the memory circuitry 16 to provide the functionality set forth below. For example, in certain embodiments, the CID 10 may be formed by the customer 12 on-demand simply by coupling a smart phone to additional hardware (e.g., sensing circuitry 20 coupled with or having radio-frequency [RF] sensors 22, processing circuitry 18, or communication circuitry 24) and/or executing a suitable app on the smart phone. For such embodiments, the CID 10 may utilize the processing, memory, and communication circuitry 18, 16, 24, as well as input and output interfaces 26, 28 of the smart phone, without an additional hardware component, thereby reducing the cost of the CID 10.

The example CID 10 illustrated in FIG. 1 includes communication circuitry 24, as previously described, that enables the CID 10 to communicate via wired (e.g., Ethernet) or wireless (e.g., cellular, WiFi, Bluetooth) network connections with one or more networks 14, as well as with other devices on the network 14. Additionally, the processing and/or communication circuitry 18, 24 of the CID 10 is capable of establishing an encrypted communication channel (e.g., a virtual private network (VPN) connection or similar secure socket layer (SSL) encrypted connection) to communicate with an online service (via the network 14) for enhanced security. In certain embodiments, the CID 10 may connect (e.g., via WiFi or Bluetooth) to a smart phone of the customer 12 such that the CID 10 can access online services via the cellular data connection of the smart phone. In other embodiments, the customer 12 may indirectly interact with the CID 10 via a smart phone device, for example, when the customer 12 is not in physical proximity to the CID 10.

The CID 10 illustrated in FIG. 1 includes a number of input device interfaces 26 that enable the CID 10 to receive input (e.g., commands, queries, authentication credentials) from the customer 12. A non-limiting list of example input devices includes: microphones 30, touchpanels or touchscreens 32, cameras 34, and motion or biometric sensors 36. As discussed in greater detail below, in certain embodiments, the CID 10 may include various system or device interfaces to enable the CID 10 to exchange information with other systems or devices. The CID 10 illustrated in FIG. 1 also includes output device interfaces 28 to enable the CID 10 to provide information to the customer 12. A non-limiting list of example output devices include: speakers 38, displays 40, indicator lights 42, vibration motors 44, and alarms (e.g., vibration or sound alarms). The sensing circuitry 20 of the CID 10 may vary or may not be present in certain embodiments, as discussed in greater detail below. The input and output interfaces 26, 28 enable the customer 12 to access an online service over the network 14 via the CID 10, to provide information or enter transactions to the online service via the CID 10, and to receive feedback, advice, notifications, or confirmation of transactions from the online service through the CID 10. For example, the customer 12 may enter inputs through the CID 10 to the online service via the input interfaces 26, and receive feedback from the online service through the CID 10 via the output interfaces 28. The inputs entered through the CID 10 to the online service may be stored in a database 15 of the online service (e.g., servers of the online service). The servers 15 (or some other hardware of the online service or parent company thereof) may also include instructions executable by processors of the servers 15 to offer feedback from the online service to the customer 12 through the output interfaces 28 of the CID 10.

In one embodiment, the CID 10 may include the microphone 30 and the touchscreen 32 as principle input devices and the speaker 38 and display 40 as principle output devices. For such embodiments, the CID 10 may be generally programmed to interact with the customer 12 via a natural language interface. For example, in certain embodiments, the CID 10 may remain in a low-power or idle state until it is activated by the customer 12 speaking an activation phrase or contacting the touchscreen 32. Further, in certain embodiments, the CID 10 may be capable of receiving and processing natural language queries from the customer 12 and responding to the customer 12 using natural language responses via the speakers 38 or display 40. In general, such embodiments enable the customer 12 to have an untrained, conversational interaction (e.g., via voice or text) with the CID 10, and the CID 10 seamlessly bridges communication between the customer 12 and the online services. This enables greater comfort and accessibility for customers 12, particularly elderly and visually-impaired customers 12. Further, voice recognition and so forth may be utilized for authentication and security purposes. As appropriate, the CID 10 may be capable of providing the customer 12 with additional information through other output devices.

In certain embodiments, the CID 10 may receive voice or text commands from the customer 12 that may be processed by the CID 10 and/or by servers 15 of the online service to enable the customer 12 to, for example, access account functions, access frequently asked question information, access concierge services, or to speak with a customer service representative. For example, if the online service is a financial service, the CID 10 may enable the customer 12 to, after identity verification, access account balances, access transactional information, change account information, order checks, request spending limit increases, determine current mortgage rates, speak with customer service representatives, or provide other suitable functionality to facilitate interaction between the customer 12 and the banking service.

In accordance with present embodiments, the CID 10 may enable the customer 12 to automatically or manually enter information relating to life-events, state-of-life, or other relevant parameters, which may then be transmitted to the database 15 (e.g., servers) that hosts (or is related) to the online service. The online service may then supply feedback related to certain financial services engaged by the customer 12, based at least in part on the information entered by the customer 12 and saved to the database 15. By further example, if the online service is a portal for a financial service offered by a financial services company, the CID 10 may enable the customer 12 to, after identity verification, submit claims, determine the status of existing claims, receive advice regarding forms, speak with a customer service representative, send messages to customer service representatives, or provide other suitable functionality to facilitate interaction between the customer 12 and the financial services company. By still further example, in accordance with embodiments of the present disclosure, the CID 10 and/or the servers 15 of the online services may facilitate or offer customized financial services (or products) to the customer 12 based at least in part on information (e.g., life-event information) relating to the customer 12.

As described above, the online service may collect data entered into the CID 10 by the user 12 and store the data in the database 15 owned, operated, or managed by an entity (e.g., parent company, financial services company) associated with the online service. Further, the data may come from elsewhere (e.g., via scraping social media, in-home sensors, or wearable devices). The database 15 (or servers) may include a memory 50 on which data is stored. For example, via the network 14, the database 15 may receive and store information (e.g., on the memory 50 of the server(s) 15) relating to life-events entered automatically or manually by the customer 12 to the online service via the CID 10. A processor 48 on the server(s) 15 may execute a computer program stored on the memory 50 of the server(s) 15 to determine, based on life-events or a state-of-life of the customer 12, customized financial services which may be offered to the customer 12.

Figure 2:
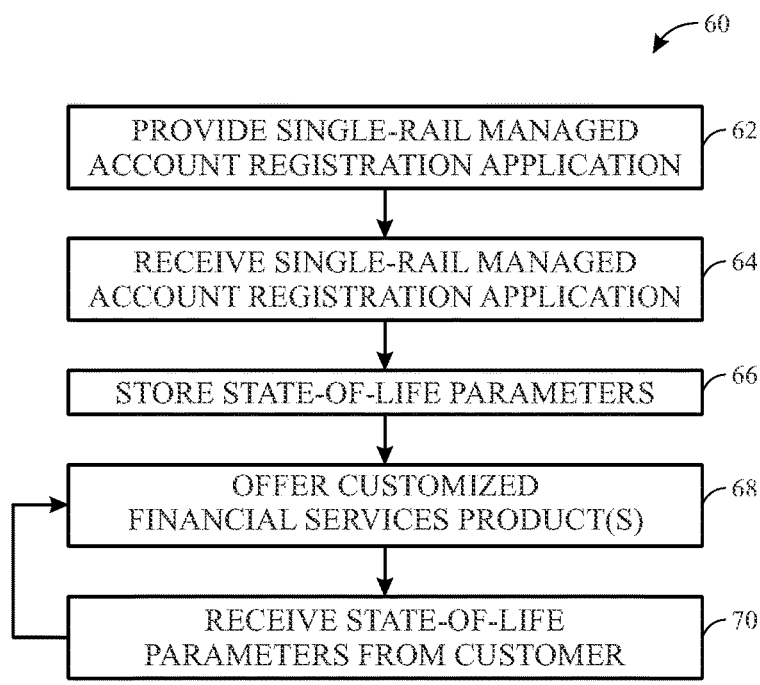
FIG. 2 is a process flow diagram illustrating an embodiment of a method of offering an online single-rail managed account product continuum accessible by the CID in FIG. 1, in accordance with an aspect of the present disclosure.

For example, a process flow diagram illustrating an embodiment of a method 60 of offering, providing, or managing a single-rail managed account accessible by the CID in FIG. 1 is shown in FIG. 2. In the illustrated embodiment, the method 60 includes providing (block 62) a single-rail managed account registration application. For example, as previously described, the customer may register for, access, and/or manage the single-rail managed account by accessing an online service (which hosts the single-rail managed account) over the network (e.g., the Internet) via the CID. The online service may offer various accounts, including the single-rail managed account in accordance with the present disclosure. The online service may provide a registration application to the customer via a webpage of the online service (e.g., website). The customer may input information in the registration application and submit the registration application. For example, the customer may enter demographic information, financial information, familial information, and/or other information into the registration application. In some embodiments, the registration application may be an interactive program hosted on servers owned by the parent company (e.g., financial services company) of the online service. For example, the registration application may prompt the customer to provide answers to various questions included in the registration application.

After the customer completes all or a portion of the registration application, the online service may receive (block 64) the registration application. For example, the online service may prompt the customer to submit the registration application after it is completed in whole or in part. The registration application may then be transmitted to the servers or database owned, operated, or managed by the online service or the parent company thereof.

After receiving the registration application for the single-rail managed account, the online service (or parent company thereof) may store (block 66) state-of-life parameters entered into (or gleaned from) the registration application onto the servers owned, operated, or managed by the online service (or parent company thereof). For example, the servers may host a database on a memory of the servers, and the state-of-life parameters of the customer may be saved to the database under a customer-specific file (e.g., customer-specific portion of memory). However, depending on the embodiment, the state-of-life parameters may be sorted or categorized, in addition to or in alternate of customer-specific files, by age, time, type of event, type of data, type of information, source of information (e.g., manual entry, automatic entry, social media scrape, wearable devices, in-home sensors) or any other suitable sortable category.

Based at least in part on the state-of-life parameters entered into the registration application by the customer or otherwise obtained, the online service may offer (block 68) customized financial service products to the customer. The offering of the customized financial service products may include two determinations. First, the online service may determine which products to offer to the customer based at least in part on the state-of-life parameters. For example, the online service may offer mortgage services to a recent college graduate or newlywed. Additionally or alternatively, the online service may offer 529 plan services to a new parent. Additionally or alternatively, the online service may offer annuities products and/or other retirement income services in response to a customer having the single-rail managed account reaching a certain age. Other comprehensive types of financial service products, packages, and features will be set forth in detail below with reference to later figures. However, in general, the financial services, and features thereof, offered in the single-rail managed account (e.g., umbrella account) may include any one or more of a general deposit account, savings booster account, credit account, managed portfolio, global opportunity portfolio, strategic fund advisor, digital investment advisor, "face-to-face" advisor (e.g., human interactive advisor), insurance account or policy (e.g., auto, medical, dental, renter's, and/or home insurance), mortgage management, retirement savings/income/investment account, or any other financial services product or feature. As described in detail below with reference to later figures, the customer may select or opt-in to any one of the offered financial service products, and the products offered to the customer may require that the customer qualify for the product, namely, by meeting certain state-of-life or life-event requirements.

In addition to offering certain products based at least in part on the customer's state-of-life parameters, the online service may offer, for a particular single product, certain features corresponding with the customer's state-of-life parameters. By way of non-limiting example, the online service may offer certain features of an annuities product (e.g., digital annuities product) based at least in part on the customer's state-of-life parameters. Indeed, if the online service deduces from the customer's state-of-life parameters that the customer has retired or is approaching retirement, and/or that the customer's savings are sufficient, the online service may offer an immediate annuities product requiring a lump sum investment but that pays annuities immediately. If the online service deduces from the customer's state-of-life parameters that the customer (a) has otherwise failed to adequately save for retirement, (b) has sufficient savings and/or disposable income, and/or (c) has some time before retirement age, the online service may offer a deferred annuities product requiring investment over a period of time and including future annuity payments. Other features of the annuities product(s) may also be offered based at least in part on the state-of-life parameters, such as whether recommendations made by the online service are digital recommendations or personal recommendations (e.g., over-the-phone, via in-person meetings), such as a type of the deferred or immediate annuities product (e.g., variable, fixed), and such as a duration of investment (e.g., 2 year, 5 year, 10 year). Further, if the online service deduces from the customer's state-of-life parameters that the customer is especially healthy for the customer's age, the online service may recommend that the customer select mortality credits.

Further still, it should be noted that the customer may customize his or her annuities product manually, and/or by responding to questions posed by the online service relating to factors determinative of the ideal annuities product for the particular customer in question. In other words, in some embodiments, the online service may make customized recommendations regarding the ideal annuities product (or features thereof) based at least in part on customer input to the online service (e.g., to the single-rail managed account of the online service). It should also be noted that certain of the features offered by the online service and selectable by the customer may enable cost-savings that are passed onto the customer, which would not otherwise be possible. For example, the online service may offer an annuities product having digital advice or analysis, instead of in-person or over-the-phone advice or analysis. By offering the advice/analysis digitally, analysis costs are saved and passed on to the customer. For example, by saving on advice/analysis costs, an interest rate associated with the annuities product (e.g., digital annuities product) may be increased. It should be noted that other digital aspects may also be offered as a feature of a particular product. For example, digital submission of documents (e.g., digital management) required for a certain product (e.g., for a mortgage service, for an annuities product) may be allowed or recommended, and may also save on costs that can be passed on at least in part to the user. In addition to cost savings, digital submission of documents may enable the customer to submit the documents on his or her own time. In traditional configurations, documents may be requested during in-person meetings with the customer, even though the customer may not have the documents on hand. Thus, traditional configurations may cause delays in registering the product with the customer until the customer provides the necessary paperwork. With the digital document submission feature, the customer may more quickly provide relevant documents and, thus, may more quickly register or purchase a product. Further still, the online service may require or recommend submission, by the customer, of certain documents required to fulfill legal fiduciary rules associated with the particular product (e.g., annuities product).

It should be noted that, in certain embodiments having the feature continuum (e.g., selectable from the single-rail managed account product continuum), the customer may select particular features recommended by the online service, and the customer may view a "shopping cart" showing the features and how the features impact the particular product associated with the feature continuum and/or the single-rail managed account as a whole. In other words, the aforementioned feature continuum may include up to three parts: (1) a portion having a bank of features relating to the product; (2) a portion having recommendations of features from the bank (e.g., where the recommendations are based at least in part on state-of-life parameters of the customer); and (3) a continuum showing features selected by the customer, and how said features are affecting or may/will affect the particular product associated with the feature continuum, and/or how said features are affecting or may/will affect the single-rail managed account as a whole. These and other features of the aforementioned feature continuum will be illustrated in, and described with respect to, FIG. 4.

After opening the single-rail managed account (e.g., by submitting all or part of the registration application and/or by opting-in to one or more financial service products offered via the single-rail managed account), the customer may periodically submit updates to the customer's state-of-life. For example, the customer may enter life-events (or information relating to life-events) to the single-rail managed account by accessing the online service via a CID, as previously described. The life-events may relate to marriage, newborns, family changes, medical conditions or emergencies, job changes, income changes, educational changes, or any other suitable life-events. The online service may receive (block 70) the state-of-life parameters entered into the single-rail managed account, and store the state-of-life parameters to the database hosted on the servers operated, owned, or managed by the parent company of the online service. The state-of-life parameters entered to the single-rail managed account after receipt of the registration application may be stored along with, or separate from, the state-of-life parameters included in the registration application.

It should also be noted that the state-of-life parameters (e.g., life events) may be manually entered by the customer, as described above, or the state-of-life parameters may be automatically submitted. For example, certain devices may track state-of-life parameters and may interface with the online service (and the single-rail managed account of the customer) via the network (e.g., Internet). Specifically, wearable devices such as medical sensing devices (e.g., heart rate monitors, blood pressure monitors, or other devices) may be worn by the customer periodically or permanently, and may transmit state-of-life parameters to the online service to be stored in the database hosted on the online service's servers. Additionally or alternatively, state-of-life parameters may be automatically submitted by hospitals, doctors, government agencies (e.g., police officers and/or enforcement agencies), or other groups or companies to the online service, in some embodiments via the consent of the customer, to be stored on the online service's database. As another example, data from social media may be scraped and analyzed by the servers/database 15 or the CID 10 to facilitate detection of life events and so forth. Accordingly, the online service may offer new customized financial service products as the customer's life (e.g., state-of-life, life events) changes over time.

Figure 3:
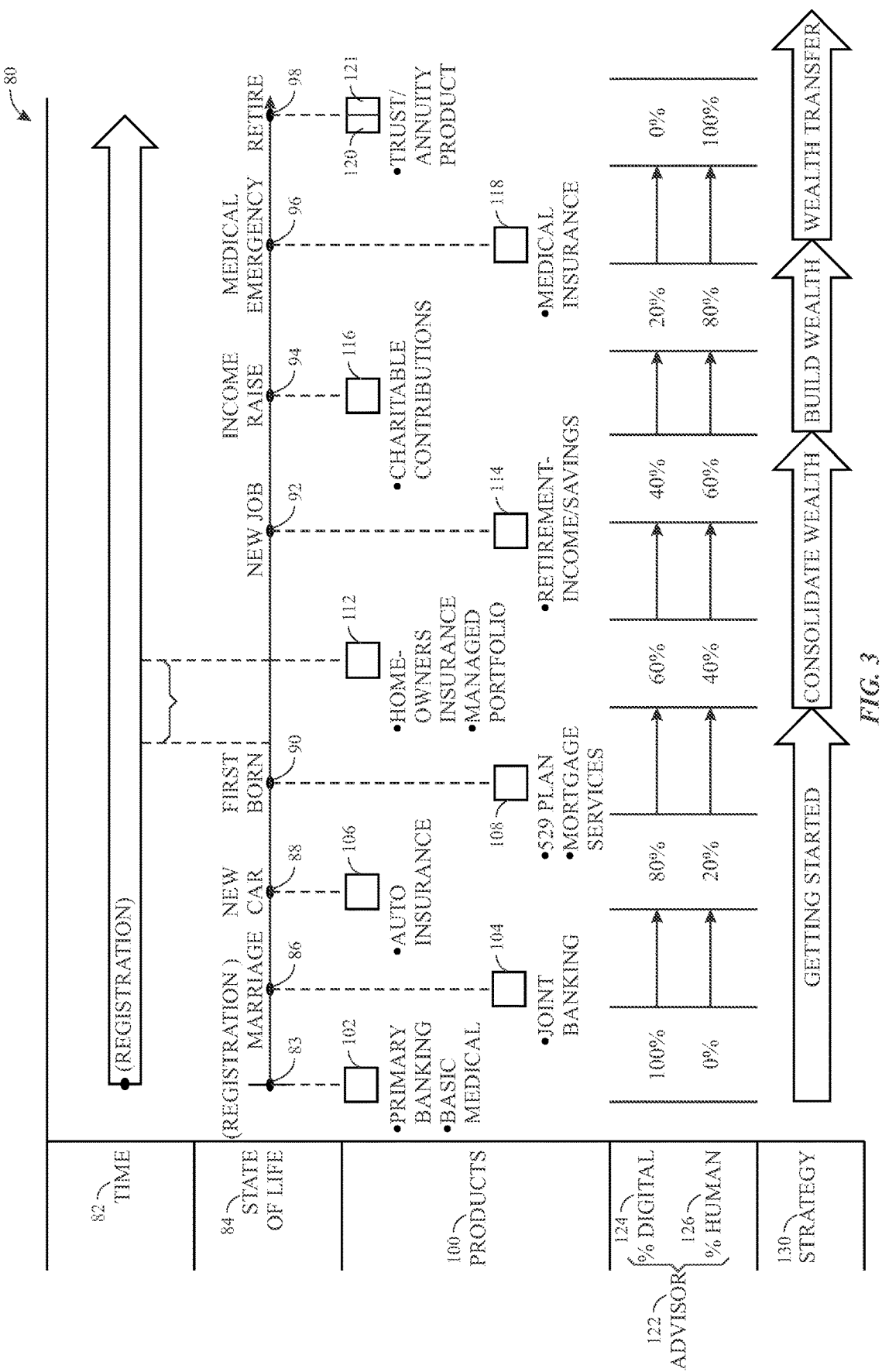
FIG. 3 is a schematic representation of an embodiment of a single-rail managed account product continuum of a system, in accordance with an aspect of the present disclosure.

FIG. 3 is a schematic representation of an embodiment of a single-rail managed account product continuum 80 (e.g., product continuum). The product continuum 80 may be representative of a graphical display illustrated on a webpage of the online service's website (e.g., a unique webpage or set of webpages representative of the customer's managed account and accessible only by the customer and parent company, or via the customer's permission), and may be accessible to the customer via a CID, as previously described. Alternatively, the product continuum 80 may be stored for use only by the parent company of the online service (e.g., the product continuum 80 may not be graphically illustrated for the customer). In one embodiment, the single-rail managed account product continuum 80 is representative of a graphical user interface available via the CID 10.

As illustrated, the product continuum 80 extends over a period of time 82 (e.g., starting with registration 83 of the account). The product continuum 80 may continue from registration 83 for the duration of the registrant's (e.g., customer's) life. As time 82 passes, various state-of-life 84 updates may be input to the managed account. For example, as previously described, the state-of-life 84 updates may be life events, life changes, lifestyle changes, or other factors or conditions associated with one's state-of-life 84 (e.g., state or standard of living). As shown, state-of-life 84 entries may include marriage 86, purchase of a new car 88, having a first-born child 90 or any other newborn child (or pregnancy), obtaining a new job 92, receiving a raise 94, having a medical emergency 96 (or newly diagnosed medical condition), retirement 98, or any other significant life event or condition. It should be noted that input of the state-of-life 84 entries may be manual or automatic. For example, the customer may manually input the state-of-life 84 entries by logging into the customer's account on the parent company's online service website (e.g., via a CID). Alternatively, the entries may be input automatically by a device (e.g., wearable device or in-home monitor/sensor) that monitors certain state-of-life 84 conditions or activities, such as medical conditions. Further, the entries may be input automatically based on various services that are linked (e.g., via the customer's permission) with the online service, such as by a hospital, school, social media service, or government agency. By further example, certain purchases via a credit card or account may trigger input of state-of-life 84 entries, such as consistent purchase of diapers or other baby products (newborn child 90), purchase of a wedding ring (marriage 86), purchase of a new car or car products (new car 88), purchase of medical equipment or payment of medical bills (medical emergency or condition 96), or other purchases. Further still, other suitable triggers may cause automatic input of state-of-life 84 entries to the online service, such as consistent direct deposit (or other forms of payment) from a new employer or entity (new job 92). Any suitable trigger for automatic input of state-of-life 84 entries to the online service may be encompassed by the present disclosure.

As previously described, certain products 100 (e.g., financial service products) of the product continuum 80 may be offered to the customer based at least in part on the state-of-life 84 entries input to the managed account of the online service. For example, after the customer successfully performs registration 83 of the managed account with the online service, the product continuum 80 may be initiated by offering primary banking/savings 102 and/or basic health insurance 104. In certain embodiments (and/or for certain products), the customer may have the option of accepting or declining products 100. For example, the customer may decline basic health insurance 104 due to already being insured by the customer's employer.

Continuing with the products 100 offered in the product continuum 80, the customer may be offered, for example, joint banking 104 in response to a detected life event of getting married 86 (e.g., joint banking 104 with the customer's spouse). Further, the customer may be offered auto insurance after detecting a life event of purchasing the new car 88. Further still, the customer may be offered a 529 plan (e.g., education savings plan) and mortgage services after detecting a life event of having the newborn child 90, due to the needs of the customer in saving for the child's college (529 plan) and increasing a living space for the new child and his/her family (mortgage services, for the purchase of a new home).

It should also be noted that certain products 100 may be offered in immediate or near-immediate response to certain state-of-life 84 entries, while other products 100 may be offered after a period of time 110 lapses from one or more of the state-of-life 84 entries. For example, as shown, homeowner's insurance and/or a managed portfolio 112 may be offered to the customer after the period of time 110 lapses from the moment the customer has the first born child 90. As previously described, mortgage services 108 may be offered immediately after detecting a life event of having the newborn child 90 (or after knowledge of the newborn child 90 or pending newborn child 90 is made known to the online service, manually or automatically), and the period of time 110 may enable the customer some time to purchase the new home prior to needing the homeowner's insurance 112. The period of time 110 may be calculated by the parent company of the online service based on an average amount of time it takes for a customer to purchase a new home following the initiation of mortgage services 108. Indeed, the period of time 110 may be applied from the moment the customer opts-in to the product 100 (e.g., mortgage services 108), or from the moment the product 100 is offered, or from the moment the state-of-life 84 entry that causes the offering of the product 100 is input into the managed account of the online service. It should be noted that the illustrated products 100 and their correlation with the state-of-life 84 entries are merely examples, and that any and all products 100 in accordance with the present disclosure may be offered in response to any and all state-of-life 84 entries in accordance with the present disclosure. Further, the period of time 110 in the illustrated example is also exemplary, may be shorter or longer than shown, and may be applied to any state-of-life 84 entry or product 100.

As described above, the online service may offer the managed portfolio 112 as a product 100 in response to an entry to the state-of-life 84 of the customer, or in response to lapsing of the period of time 110 from a previous state-of-life 84 entry. The managed portfolio 112 may enable the customer to invest in mutual funds, exchange traded funds, or any other investment opportunities. Advisement of the investment opportunities, of the managed portfolio 112, and of the products 100 in general, may be offered by the parent company through the online service in a number of ways. Advisement considerations will be discussed in detail below.

Other products 100 offered in response to state-of-life 84 entries may include retirement savings 114 (e.g., in response to the customer obtaining the new job 92), charitable contribution services 116 (in response to the customer obtaining the new raise 94), health insurance or updates or changes to health insurance 118 (e.g., based on the medical emergency or condition 96), and trust services and annuities products 120, 121 (e.g., in response to retirement 98). It should be noted that other qualification requirements or recommendations from the online service may prompt offering of certain products 100. For example, trust services 120 may be offered if the customer exceeds a threshold wealth or a more complex assessment metric, (e.g., which may be calculated by the parent company of the online service), and annuities products 121 (e.g., immediate annuities product) may be offered if the customer includes a certain amount of savings in the customer's primary banking 102. Further, managed accounts 112 (or types of managed accounts 112) may be offered based on income, salary, accrued wealth, or some other qualification requirement or recommendation. Other qualification requirements may also be included. For example, a minimum monthly contribution by the customer may be required for the customer to opt-in to certain products 100 like the 529 plan 108, retirement savings 114, managed portfolio services 112, charitable contribution services 116, primary banking/savings 102 (e.g., a savings booster account), or any other suitable product 110.

With respect to requirements for accessing particular financial products 100 through the single-rail managed account, it should be noted that, in some embodiments, the customer may develop (e.g., with or without digital or human advisement from the online service or entity thereof) a long term financial plan encompassing many products 100, each product 100 being available via the single-rail managed account. For example, developing the long term financial plan may include completing an underwriting process and passing certain legal requirements for some or all of the products 100 listed in the long term plan, including those products 100 the customer does not plan to immediately acquire. As the customer experiences certain state-of-life 84 changes (e.g., life events) related to certain products 100 (e.g., products 100 included in the long term financial plan), the product 100 may become immediately available for the customer. Accordingly, the customer may pass all financial, legal, and other requirements during a single financial planning and/or screening process, and any product 100 the customer qualifies for following the planning and/or screening process may be made available to the customer automatically at appropriate times (e.g., following certain state-of-life 84 changes or entries). It should also be noted that the customer's single-rail managed account is not bound to only the products 100 the customer qualifies for following the long term financial plan. For example, the customer, based on unexpected state-of-life 84 experiences, may change the long term plan or may benefit from certain other products 100. Accordingly, the customer may access the single-rail managed account at any time to provide new information, new financial plans, or other information that may facilitate offering of products 100 that most benefit the customer.

Further, the customer may not qualify for certain products 100 included in the long term financial plan until the customer experiences certain state-of-life 84 events or conditions. Thus, products 100 included in the long term financial plan may be made available to the customer only after the single-rail managed account receives the necessary state-of-life 84 entries. However, other products 100 included in the long term financial plan may be available to the customer at any time, but may be suggested to the customer following certain state-of-life 84 entries associated with the products 100.

In addition to offering products 100 as the customer's state-of-life 84 changes, the online service may initiate (e.g., issue automated instructions to initiate or offer) different types of advisement 122 based on the customer's state-of-life 84, or based on the products 100 the customer opts-in on. For example, advisement 122 from the online service or parent company thereof may be digital 124 (e.g., automated digital advisement through the online service's website) and/or human 126 (e.g., over-the-phone, face-to-face, or via online chat with a human representative). As the customer's state-of-life 84 changes and as the customer's financial needs evolve, advisement 122 from the online service or parent company thereof may change. Initially, advisement 122 may be primary or wholly digital 124 (e.g., 100% digital 124 and 0% human 126). Certain products 100 selected by the customer (and offered to the customer based on the state-of-life 84 entries) may prompt the online service or parent company thereof to reduce digital advisement 124 and increase human advisement 126. For example, after selecting auto insurance 106 as one product 100, the customer may receive 80% digital advisement 124 and 20% human advisement 126. Other changes to advisement 122 may be time-dependent instead of product dependent. For example, as the customer ages, the customer's adeptness with technology (or ability to keep up with modern technology) may diminish. Thus, the customer may prefer human advisement 126 to digital advisement 124. Further, as the product continuum 80 evolves (as monitored by system features), the customer may partake in an increasing number of financial service products 100. Thus, the customer may respond better to (or prefer) human advisement 126 to digital advisement 124. In some embodiments, the customer may be allowed to select a preferred amount of digital advisement 124 and/or human advisement 126. For example, the online service may provide an accepted range of digital advisement 124 and/or human advisement 126, and the customer may customize advisement 122 within the allowed ranges to tailor advisement 122 to the customer's preferences. Specifically, certain portions of the portfolio may be designed for either human or digital advisement.

Also included in the illustrated product continuum 80 is a strategy indicator 130. The strategy indicator 130 may include indications of a type of wealth management strategy for the customer during various stages of the product continuum 80. The strategy indicator 130 may include various stages of strategy, such as "getting started" 132, "consolidate wealth" 134, "build wealth" 136, and "wealth transfer" 138. Other suitable stages of strategy may also be indicated, and each stage of strategy may correspond with the various products 100 the customer opts-in on. Each customer may seek a unique, customer-specific wealth management strategy. Accordingly, each customer may include a unique, customer-specific strategy indicator 130. For example, a young, wealthy philanthropist may enter the "wealth transfer" 138 stage earlier, or in a different sequence, than other customers. In some embodiments, the stages of strategy of the strategy indicator 130 may be chosen or recommended by the online service (or parent company thereof) based on any number of factors, including but not limited to the amount of time 82 the customer has engaged the managed account and corresponding product continuum 80, the state-of-life 84 entries manually and/or automatically input to the managed account, the products 100 the customer opts-in on, the type of advisement 122 provided to the customer, and other factors (e.g., demographics, income, salary, or accrued wealth), which may facilitate wealth management understanding and customized benefits for the customer.

Figure 4:
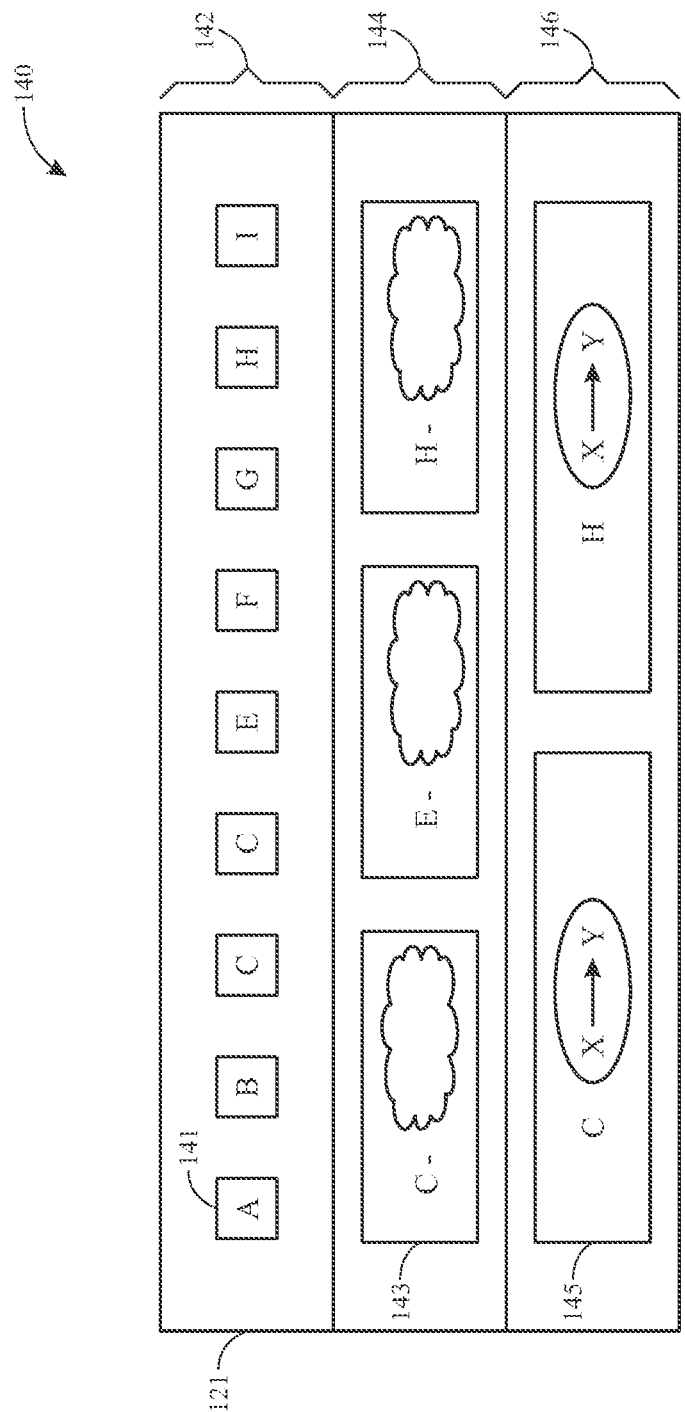
FIG. 4 is a schematic representation of an embodiment of a feature continuum of a single product included on the single-rail managed account product continuum of FIG. 3, in accordance with an aspect of the present disclosure.

FIG. 4 is a schematic representation of an embodiment of a feature continuum 140 of a single product (e.g., the annuities product 121) included on the single-rail managed account product continuum 80 of FIG. 3, which may be accessible by the customer on the Internet (e.g., by utilizing the CID 10 in FIG. 1). In the illustrated embodiment, as previously described, the feature continuum 140 of the annuities product 121 may include three portions 142, 144, 146 (e.g., streams). The first stream 142 may include a bank of features 141 (e.g., features A, B, C, D, E, F, G, H, and I) relating to the annuities product 121. The features 141 may include, for example, an immediate annuities option, a deferred annuities option, a fixed annuities option, a variable annuities option, mortality credit options, surrender charge options, annual credit bonus options, and/or digital advice options. The first stream 142 (e.g., the bank of features 141) may include a name of each option relating to the annuities product 121 and/or a brief description or picture of the options relating to the annuities product 121.

The feature continuum 140 may also include the second stream 144 having, for example, recommended features 143 of the annuities product 121. For example, as previously described, the online service may recommend the recommended features 143 (e.g., from the bank of features 141 in the first stream 142 of the feature continuum 140) based at least in part on state-of-life parameters of the customer, and/or based on a cost savings goal of the customer. For example, one of the recommended features 143 may be "digital annuities," i.e., digital advice and/or analysis that in other embodiments is provided in-person or over-the-phone (e.g., by a human operator). Digital annuities may reduce costs associated with providing the annuities product, and cost savings may be passed on to the customer. Other recommended features 143 may include, as previously described, an immediate annuities option, a deferred annuities option, a fixed annuities option, a variable annuities option, mortality credit options, surrender charge options, and/or annual credit bonus options. Each of the recommended features 143 may include, for example, the name of the recommended feature 143, and a detailed description of the recommended feature 143. In some embodiments, the second stream 144 may show how the recommended feature 143 would affect the customer's annuities product 121 (and/or the customer's single-rail managed account product continuum 80 of FIG. 3). However, in other embodiments, the effects of particular features on the customer's annuities product 121 (and corresponding feature continuum 140) and/or the customer's single-rail managed account product continuum 80 may be displayed in the third stream 146, as described below.

The feature continuum 140 may include the third stream 146 having, for example, selected features 145 (e.g., selected by the customer). The selected features 145 on the feature continuum 140 may show, for example, a name or picture of the product, a description (e.g., brief or detailed) of the product, and/or effects of the selected feature 145 on the customer's annuities product 121 (or feature continuum 140 thereof) and/or on the customer's single-rail managed account product continuum 80 (e.g., of FIG. 3). For example, each of the selected features 145 may show a cost of the annuities product 121 calculated based at least in part on which of the features 141 or recommended features 143 are selected as the customer's selected features 145. Indeed, if the customer selects the previously described "digital advice/analysis" feature, the selected feature 145 (e.g., the digital advice/analysis feature) on the feature continuum 140 may show the cost of the annuities product 121 with and without the selected feature 145 (e.g., the digital advice/analysis feature). Other effects are also possible, such as effects on other products (e.g., primary banking) included on the customer's single-rail managed account product continuum 80.

Figure 5:
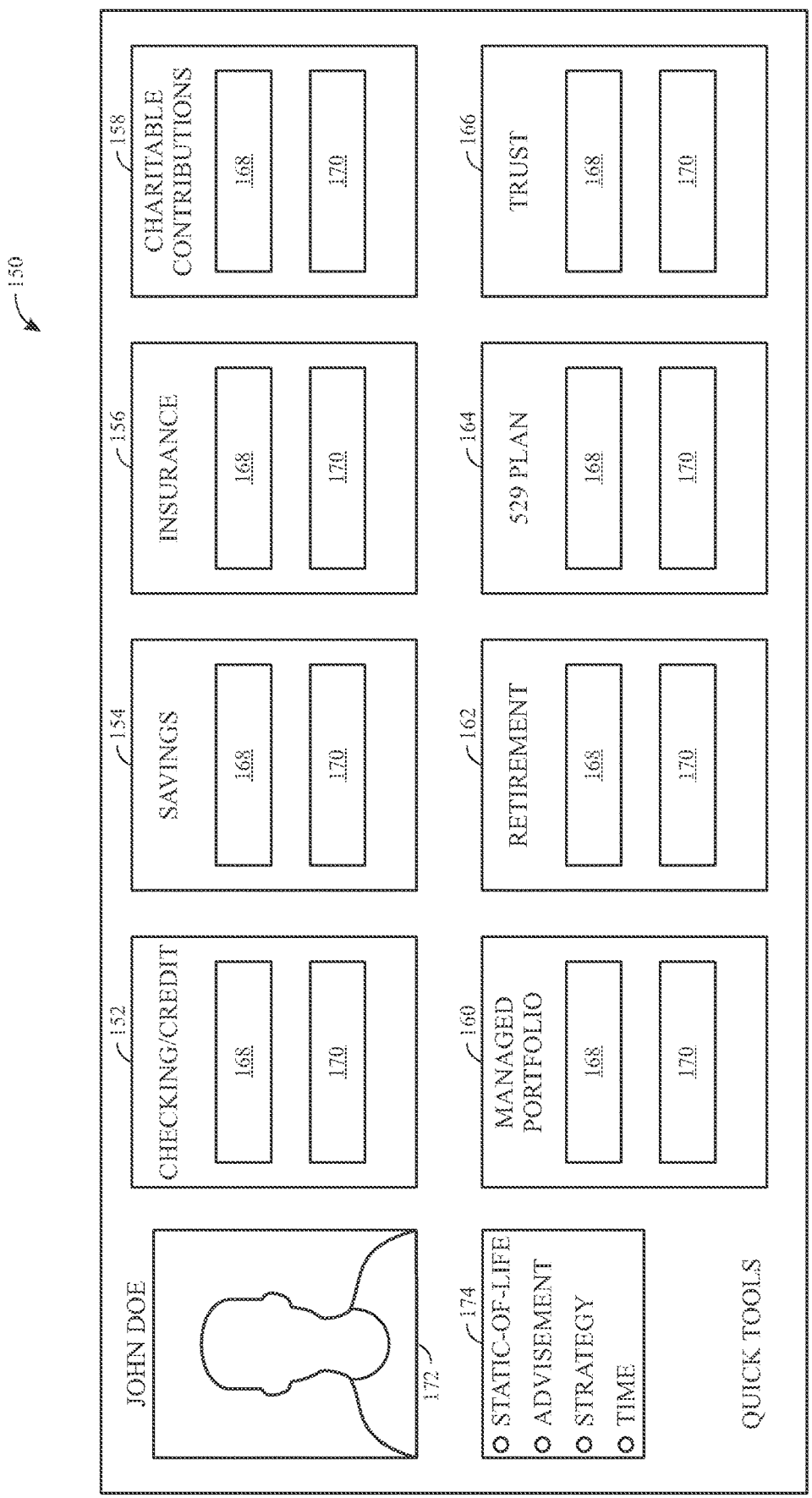
FIG. 5 is a schematic representation of an embodiment of a dashboard view of a single-rail managed account of a system display, which may be accessible on the Internet or otherwise electronically accessible by the CID in FIG. 1, in accordance with an aspect of the present disclosure.

FIG. 5 is a schematic representation of an embodiment of a dashboard view 150 of a single-rail managed account (e.g., single-rail managed account product continuum), which may be accessible by the customer on the Internet (e.g., by utilizing the CID 10 in FIG. 1). In other words, the illustrated dashboard view 150 may be displayed on a webpage of a website hosted on or by the online service and/or parent company thereof. The dashboard view 150 may be a home page of the customer's online single-rail managed account, or the dashboard view 150 may be accessible through the home page or through some other webpage corresponding with the customer's online single-rail managed account.

The illustrated dashboard view 150 may include various features that enable ease of access and understanding of various products (e.g., financial service products) the customer selects from the single-rail managed account (or which the online service suggests to the customer). For example, the dashboard view 150 may include graphics indicative of the products the customer engages. As shown, the products may include checking or credit services (or accounts) 152, savings services (or accounts) 154, insurance 156 (e.g., health insurance, renter's insurance, homeowner's insurance, or other types of insurance), charitable contribution services 158, one or more managed portfolios 160, retirement savings services (or accounts) 162 (e.g., a 401 [k]), a 529 plan 164, and trust services 166. Other suitable products (e.g., financial service products) in accordance with the present disclosure may also be included. Each of the products may include various informative and/or transactional features within the corresponding product box. For example, each product may include an informative box 168, which informs the customer of various measurements, statistics, and/or analysis of information associated with the product. By way of non-limiting example, the checking/credit box 152 may include a balance in the informative box 168. Further, the savings box 154 may also include a balance in the informative box 168. The checking/credit and savings boxes 152, 154 may include information relating to recent withdrawals from, or deposits to, the accounts 152, 154 in the corresponding informative boxes 168. The insurance box 168 may include information in the informative box 168 relating to premiums, deductibles, and/or payments due or made. The charitable contributions box 158 may include information in the informative box 168 relating to charitable organizations to which the customer intends to donate funds. The managed portfolio box 160, retirement box 162, 529 plan box 164, and trust box 166 may also include relevant information in the corresponding informative box 168.

Each product box may also include a transactional box 170 (e.g., control box), which includes control features the customer may access for changing or updating functionality and/or transactions associated with the corresponding product. For example, the customer may utilize the transaction box 170 of the managed portfolio product 160 to update or change mutual funds in which the customer would like to invest. The 529 plan 164 may include controls in the corresponding control box 170 that enables the customer to update or change an amount of money deposited in the 529 plan 164 on a monthly basis (e.g., which may be directly drawn from the customer's checking/credit account 152 and/or savings account 154). Each of the products may include relevant control features in the corresponding control boxes 170 that facilitate control by the customer.

It should be noted that, due to federal and/or state regulations, certain functionality, information, and/or control of certain financial service products may not be allowed within a single account. For example, some states may have regulatory laws that do not allow certain information or control features associated with certain accounts (e.g., mortgage accounts) to be managed or displayed under an umbrella account that also includes other certain accounts (e.g., checking/credit account) and corresponding information/management. In other words, some states may have regulatory laws that require separate customer accounts for separate financial products, or for separate functionalities associated with separate financial products. For such jurisdictions, the online service may include a "legal filter" that filters out information or control functionality that is not permitted within the single-rail managed account in such jurisdictions. For example, a separate legal filter may be included for each jurisdiction. The legal filters may be software modules stored on servers of the online service (or parent company thereof), and may be automatically applied to a customer's single-rail managed account based on demographic or personal information entered by the customer during the registration process. In some embodiments, legal filters may be included with attachable hardware features that interact with a customer device. Accordingly, permitted information may pass through the legal filter such that the customer may access all permitted information via the dashboard view 150. In order to access certain information or control functionality that is not permitted by law, rule, or regulation under the umbrella single-rail managed account, the customer may be required to register an additional account, of which a separate log-in may be required. In permitted cases, the customer may access the log-in page for the separate account via the umbrella account illustrated in the dashboard view 150 of FIG. 5.

It should also be noted that the dashboard view 150 may include a customer-specific identification box 172, which may include a picture of the customer. The customer-specific identification box 172 may indicate to the customer that the customer has accessed the appropriate single-rail managed account (e.g., via a log-in process of the online service). The identification box 172 may include other information, such as the customer's name, age, or other information, within the box 172 or surrounding the box 172. The dashboard view 150 also includes a quick tools box 174 that enables certain other functionality. For example, the quick tools box 174 may enable the customer to enter or continue (or view) automatically entered state-of-life entries, as previously described, adjust the customer's advisement preferences, as previously described, adjust or view a current financial strategy of the customer, and/or view a history of the customer's single-rail managed account.

Figure 6:
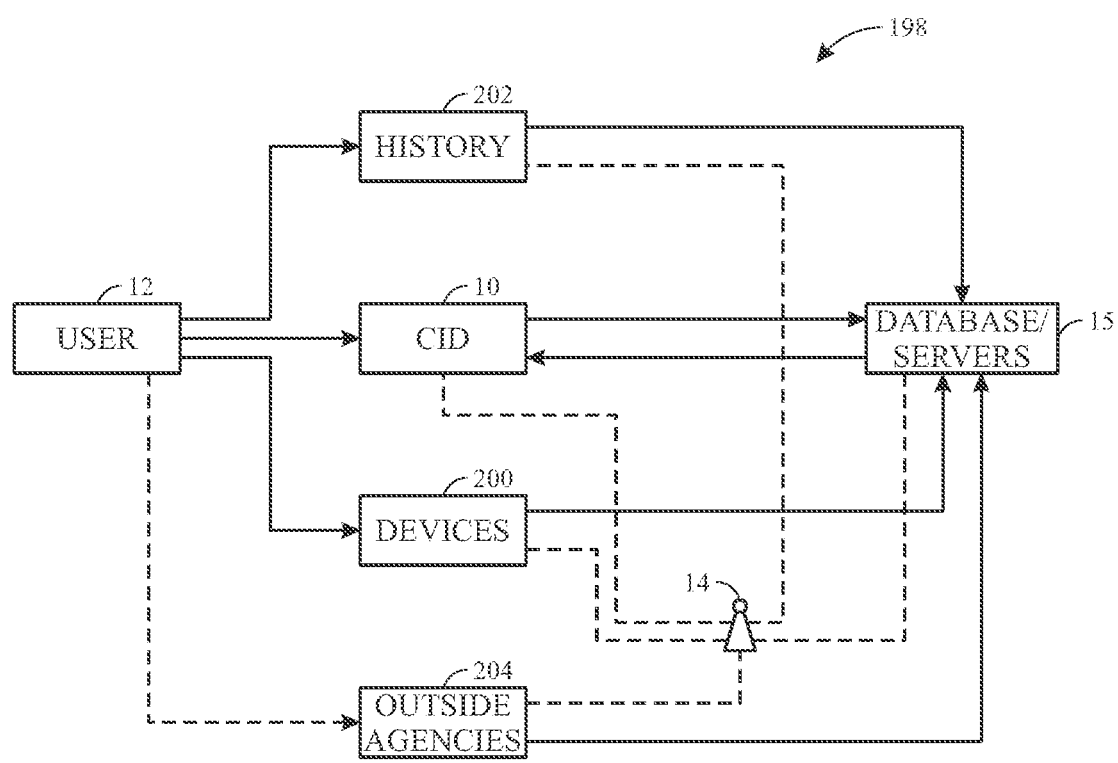
FIG. 6 is a schematic representation of an embodiment of a system of various devices that interface with and/or facilitate management of a single-rail managed account product continuum, in accordance with an aspect of the present disclosure.

FIG. 6 is a schematic representation of an embodiment of a system 198 for inputting (manually and/or automatically) state-of-life entries to the single-rail managed account, as previously described, such that financial service products may be offered to the customer through the single-rail managed account based at least in part on the customer's state-of-life. As shown in the illustrated embodiment, the user/customer 12 may manually input state-of-life entries to the managed account via the CID 10. The CID 10 may communicate, via the Internet 14, the entries to the database or servers 15 owned, operated, or managed by the parent company of the online service.

Additionally or alternatively, the customer 12 may enable the online service to access the customer's 12 purchase history or other available data (e.g., social media data) 202. The customer's 12 purchase history or other available data (e.g., social media data) 202 may be automatically communicated, via the Internet 14 or some other network or system, to the servers 15 of the online service (or parent company thereof). The servers 15 may include a program (e.g., stored in a memory of the servers 15, and executed by one or more processors of the servers 15) that deciphers state-of-life conditions or events based on the purchase history or other available data (e.g., social media data) 202 communicated to, and stored in, the memory of the servers 15. For example, the customer's 12 purchase history or other available data (e.g., social media data) 202 may include purchase of baby diapers (signifying a newborn child), and the program may determine that financial service products associated with a newborn child (e.g., a 529 plan) may be offered to the customer 12.

Further, as previously described, devices 200 (e.g., wearables, phones, in-home monitors/sensors, car sensors) may be communicatively coupled (e.g., via the Internet 14) with the servers 15. The devices 200 (or device) may be worn by the customer 12 and may monitor certain conditions of the customer 12 (e.g., amount of travel, medical conditions, vitals). The conditions of the customer 12 may be communicated to the servers 15, and the servers 15 may include a program (e.g., stored in the memory of the servers 15, and executed by one or more of the processors of the servers 15) that deciphers state-of-life conditions or events based on the conditions monitored by the device(s) 200 and communicated to, and stored in, the memory of the servers 15. For example, the customer's 12 device 200 may monitor a blood pressure of the customer 12 or a heart rate of the customer 12, and the program may determine that certain medical insurance or care is recommended or needed. Thus, the program may communicate the recommended medical insurance to the customer 12 from the servers 15. In another embodiment, the device 200 may monitor an amount and/or type of travel of the customer 12 and, based on the amount and/or type of travel, may recommend car insurance, life insurance, or other financial service products associated with travel.

Further still, as previously described, outside agencies 204 (or databases thereof) may also be communicatively coupled (e.g., via the Internet 14) with the servers 15 of the online service or parent company thereof. For example, the customer 12 may grant permission to communicatively couple the servers 15 with various outside agencies 204, such as hospitals, doctors' offices, and/or government agencies. Information may be automatically communicated from the outside agencies 204 to the servers 15, and the servers 15 may decipher, from the information received from the outside agencies 204, state-of-life entries or conditions that may determine certain products offered to the customer, as previously described. For example, a civil system of a government agency may communicate to the servers 15 of the parent company information relating to a pending divorce between the customer 12 and the customer's 12 spouse. The servers 15 may communicate to the customer 12, via the CID 10, various financial service products associated with divorce, and the customer 12 may choose to opt-in on said products.

In general, embodiments in accordance with the present disclosure are directed to a single-rail managed account product continuum (e.g., accessible via an online service), where the single-rail managed account spans for a long duration of the customer's life and may include offering or recommending of a wide array of financial service products under a single account. The single-rail managed account, offered online via the online service, may facilitate ease of access and understanding of financial services and finances in general for the customer. Further, financial service products offered to the customer are customized for the customer based on state-of-life conditions or events that are manually or automatically input to the single-rail managed account (e.g., via the corresponding online service), as previously described.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a customer interface configured to display a single-rail managed account product continuum;
a monitor configured to scrape a social media account associated with a user, wherein the social media account is indicative of state-of-life data of the user; and
a server comprising a memory and a processor, the memory storing instructions that, when executed, cause the processor to:
receive the state-of-life data associated with the social media account, wherein the social media account is linked to the server;
execute a program to decipher the state-of-life data associated with the social media account;
determine a recommendation of a financial service product based on executing the program and the state-of-life data; and
send the recommendation of the financial service product to the customer interface to display the recommendation of the financial service product.

2. The system of claim 1, wherein the customer interface is configured to receive second state-of-life data and send the second state-of-life data to the server, wherein the instructions are configured to cause the processor to determine the recommendation of the financial service product based at least in part on the second state-of-life data.

3. The system of claim 1, wherein the financial service product comprises a credit service product, a checking service product, a general savings service product, or any combination thereof.

4. The system of claim 1, wherein the financial service product comprises a plurality of features, wherein the instructions are configured to cause the processor to:
determine an additional recommendation of a feature of the plurality of features based on the state-of-life data; and
send the additional recommendation of the feature to the customer interface, wherein the customer interface is configured to display the additional recommendation of the feature as part of the single-rail managed account product continuum.

5. The system of claim 4, wherein the feature comprises a digital analysis feature or a digital management feature.

6. The system of claim 1, wherein the processor is configured to automatically receive the state-of-life data from the social media account independent of a user input.

7. A method of providing a single-rail managed account product continuum, comprising:
    scraping a social media account of a user via a monitor, wherein the social media account is indicative of state-of-life data of the user;
    receiving the state-of-life data associated with the social media account, wherein the social media account is linked to the single-rail managed account product continuum;
    executing a program to decipher the state-of-life data associated with the social media account;
    determining a recommendation of one or more financial service products based on executing the program and the state-of-life data; and
    sending the recommendation of the one or more financial service products to a customer interface device for display.

8. The method of claim 7, wherein the one or more financial service products comprises an annuities product, a credit service, a checking service, a general savings service, an insurance service, a managed investment portfolio service, or any combination thereof.

9. The method of claim 7, wherein the recommendation comprises a selected financial service product, and the method comprises displaying the selected financial service product on the customer interface device in response to receiving the selected financial service product.

10. The method of claim 7, wherein the one or more financial service products comprise a plurality of features, and wherein the method comprises:
    determining an additional recommendation of a feature of the plurality of features based on the state-of-life data; and
    sending the additional recommendation of the feature to the customer interface, wherein the customer interface is configured to display the additional recommendation of the feature as part of the single-rail managed account product continuum.

11. The method of claim 10, wherein the feature comprises a digital analysis feature or a digital management feature.

12. The method of claim 7, comprising automatically receiving the state-of-life data from the social media account independent of a user input.

13. The method of claim 7, comprising:
    receiving, via the customer interface, second state-of-life data; and
    determining the recommendation of the one or more financial service products based at least in part on the second state-of-life data.

14. One or more tangible, non-transitory, machine-readable media comprising instructions configured to cause a processor to:
    provide a single-rail managed account product continuum on a customer interface device;
    scrape a social media account of a user via a monitor, wherein the social media account is indicative of state-of-life data of the user;
    receive the state-of-life data associated with the social media account, wherein the social media account is linked to the single-rail managed account product continuum;
    execute a program to decipher the state-of-life data associated with the social media account;
    determine a recommendation of a financial service product based on executing the program and the state-of-life data; and
    send the recommendation of the financial service product to the single-rail managed account product continuum on the customer interface device.

15. The one or more tangible, non-transitory, machine-readable media of claim 14, wherein the customer interface device is configured to display the recommendation of the financial service product as part of the single-rail managed account product continuum.

16. The one or more tangible, non-transitory, machine-readable media of claim 14, wherein the financial service product is configured to display a cost savings.

17. The one or more tangible, non-transitory, machine-readable media of claim 14, wherein the financial service product comprises an insurance service product, a managed investment portfolio service product, an annuities service product, or any combination thereof.

18. The one or more tangible, non-transitory, machine-readable media of claim 14, wherein the financial service product comprises a plurality of features, and wherein the instructions cause the processor to:
    determine an additional recommendation of a feature of the plurality of features based on the state-of-life data, wherein the feature comprises a digital analysis feature or a digital management feature; and
    send the additional recommendation of the feature to the customer interface device, wherein the customer interface device is configured to display the additional recommendation of the feature as part of the single-rail managed account product continuum.

19. The one or more tangible, non-transitory, machine-readable media of claim 14, wherein the instructions cause the processor to automatically receive the state-of-life data from the social media account independent of a user input.

20. The one or more tangible, non-transitory, machine-readable media of claim 14, wherein the instructions cause the processor to:
    receive, via the customer interface device, second state-of-life data; and
    determine the recommendation of the financial service product based at least in part on the second state-of-life data.

* * * * *